United States Patent
Mantell et al.

(10) Patent No.: US 11,518,092 B2
(45) Date of Patent: Dec. 6, 2022

(54) PATTERNED PRE-STOP FOR FINISHING ADDITIVE MANUFACTURED 3D OBJECTS

(71) Applicant: Xerox Corporation, Norwalk, CT (US)

(72) Inventors: David A. Mantell, Rochester, NY (US); Peter J. Nystrom, Webster, NY (US); Marc D. Daniels, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 160 days.

(21) Appl. No.: 16/445,703

(22) Filed: Jun. 19, 2019

(65) Prior Publication Data

US 2020/0398481 A1  Dec. 24, 2020

(51) Int. Cl.
| | | |
|---|---|---|
| *B29C 64/165* | (2017.01) | |
| *B29C 64/205* | (2017.01) | |
| *B29C 64/245* | (2017.01) | |
| *B29C 64/35* | (2017.01) | |
| *B33Y 10/00* | (2015.01) | |

(Continued)

(52) U.S. Cl.
CPC .......... *B29C 64/165* (2017.08); *B29C 64/205* (2017.08); *B29C 64/245* (2017.08); *B29C 64/35* (2017.08); *B33Y 10/00* (2014.12); *B33Y 30/00* (2014.12); *B33Y 40/00* (2014.12)

(58) Field of Classification Search
CPC ... B29C 64/147; B29C 64/165; B29C 64/205; B29C 64/223; B29C 64/245; B29C 64/35; B29C 64/40; B22F 10/40
See application file for complete search history.

(56) References Cited

U.S. PATENT DOCUMENTS

| | | |
|---|---|---|
| 3,473,205 A | 10/1969 | Zocher |
| 3,774,273 A | 11/1973 | Okamoto et al. |
| 5,173,733 A | 12/1992 | Green |

(Continued)

FOREIGN PATENT DOCUMENTS

| | | |
|---|---|---|
| EP | 2776233 | 12/2017 |
| WO | WO2014134224 | 9/2014 |

OTHER PUBLICATIONS

Wikipedia (2018). Augmented Reality. Wikipedia, the free encyclopedia. Dec. 6, 2018 from https://en.wikipedia.org/wiki/Augmented_reality.

(Continued)

*Primary Examiner* — Yunju Kim
(74) *Attorney, Agent, or Firm* — Caesar Rivise, PC (57) ABSTRACT

An additive manufacturing system and method for improving the certainty of removing or etching excess substrate from a stack of printed substrate slices to arrive at a 3D object. The approach includes printing a pseudo image as a shell layer around a desired object slice with less polymer (e.g., thermoplastic) material than the 3D object solid layer slice. This slows the etching process when this pseudo image is reached. The pseudo image may be printed to surround the object polymer image on a printed substrate sheet as a shell that provides notice during the excess substrate removal/cleaning process that the desired polymer image is nearby and extra care must be taken to avoid removal of the desired polymer image. The pseudo image may have a 3D patterned surface that can be recognized by a person doing the sandblasting or recognized automatically by an automated 3D object finisher.

17 Claims, 6 Drawing Sheets

(51) Int. Cl.
B33Y 30/00 (2015.01)
B33Y 40/00 (2020.01)

(56) References Cited

U.S. PATENT DOCUMENTS

| | | | |
|---|---|---|---|
| 5,943,125 | A | 8/1999 | King et al. |
| 6,377,758 | B1 | 4/2002 | OuYang et al. |
| 7,050,078 | B2 | 5/2006 | Dempski |
| 7,324,081 | B2 | 1/2008 | Friedrich et al. |
| 7,463,149 | B2 | 12/2008 | Friedrich et al. |
| 8,116,585 | B2 | 2/2012 | Wu et al. |
| 8,496,370 | B2 | 7/2013 | Hsu |
| 8,756,894 | B2 | 6/2014 | Swartz et al. |
| 8,786,686 | B1 | 7/2014 | Amirparviz |
| 9,266,287 | B2 | 2/2016 | Kautz et al. |
| 9,393,770 | B2 | 7/2016 | Swartz et al. |
| 9,507,788 | B2 | 11/2016 | Pavlov et al. |
| 9,683,950 | B2 | 6/2017 | Sarrazin et al. |
| 9,740,974 | B2 | 8/2017 | Kumar et al. |
| 9,776,376 | B2 | 10/2017 | Swartz et al. |
| 9,827,754 | B2 | 11/2017 | Swartz et al. |
| 9,833,949 | B2 | 12/2017 | Swartz et al. |
| 10,046,552 | B2 | 8/2018 | Swartz et al. |
| 2002/0133264 | A1 | 9/2002 | Maiteh et al. |
| 2004/0175451 | A1* | 9/2004 | Maekawa ............... B29C 41/36 425/144 |
| 2004/0183796 | A1* | 9/2004 | Velde ..................... B29C 64/40 345/419 |
| 2006/0255525 | A1 | 11/2006 | Dinatale et al. |
| 2013/0171431 | A1 | 7/2013 | Swartz et al. |
| 2014/0085620 | A1 | 3/2014 | Lobovsky et al. |
| 2014/0238173 | A1 | 8/2014 | Swartz et al. |
| 2014/0257549 | A1 | 9/2014 | Swartz et al. |
| 2015/0034123 | A1 | 2/2015 | Pressacco et al. |
| 2015/0158246 | A1 | 6/2015 | Swartz et al. |
| 2015/0231825 | A1 | 8/2015 | Swartz et al. |
| 2016/0082657 | A1* | 3/2016 | Swartz ................. B29C 64/188 425/110 |
| 2016/0082658 | A1 | 3/2016 | Swartz et al. |
| 2016/0260261 | A1 | 9/2016 | Hsu |
| 2016/0297142 | A1 | 10/2016 | Bheda et al. |
| 2016/0339645 | A1 | 11/2016 | Swartz et al. |
| 2017/0106586 | A1 | 4/2017 | Keoshkerian et al. |
| 2017/0144426 | A1 | 5/2017 | Moore et al. |
| 2017/0151719 | A1 | 6/2017 | Swartz et al. |
| 2017/0239893 | A1* | 8/2017 | Hoover ................... B29C 64/40 |
| 2017/0291223 | A1 | 10/2017 | Swartz et al. |
| 2017/0297303 | A1 | 10/2017 | Swartz |
| 2017/0368744 | A1 | 12/2017 | Zona et al. |
| 2018/0008141 | A1 | 1/2018 | Krueger |
| 2018/0022065 | A1 | 1/2018 | Swartz et al. |
| 2018/0072001 | A1 | 3/2018 | Swartz et al. |
| 2018/0141305 | A9 | 5/2018 | Swartz et al. |
| 2018/0169957 | A1* | 6/2018 | Mark ..................... B29C 64/165 |
| 2018/0264725 | A1 | 9/2018 | Swartz et al. |
| 2018/0264732 | A1 | 9/2018 | Swartz et al. |
| 2018/0370155 | A1* | 12/2018 | Courter ................ B29C 67/0088 |
| 2019/0067077 | A1 | 2/2019 | Muramoto |

OTHER PUBLICATIONS

Impossible Objects' CBAM Pilot Project (video), https://www.youtube.com/watch?v=Dn37IXU2K0M, retrieved Dec. 12, 2018.

\* cited by examiner

PATTERNED PRE-STOP FOR FINISHING ADDITIVE MANUFACTURED 3D OBJECTS

FIELD OF DISCLOSURE

This disclosure relates generally to systems and methods for composite-based additive manufacturing, and more particularly, to implementing a comparatively higher speed process for cutting web fed substrate material into sheared and stacked individual substrate sheets in the process of building up printed substrate sheet layers configured to form and/or manufacture three-dimensional objects, parts and components (3D objects).

BACKGROUND

Traditional object, part and component manufacturing processes, which generally included varying forms of molding or machining of output products, have expanded to include commercial implementations of a new class of techniques globally referred to as "additive manufacturing" or AM techniques. These AM techniques generally involve processes, alternatively referred to as "Solid Freeform Fabrication (SFF)" or "3D printing" in which layers of additive materials, sometimes toxic or otherwise hazardous in an unfinished state are sequentially deposited on an in-process 3D object according to a particular material deposition and curing scheme. As each layer is added in the 3D object forming process, the new layer of material is added and adhered to the one or more already existing layers. Each AM layer may then be individually cured, at least partially, prior to deposition of any next AM layer in the 3D object build process. This sequential-layer material addition/joining throughout a 3D work envelope is executed under automated control of varying levels of sophistication.

AM manufacturing techniques include, but are not limited to, those techniques that have come to be referred to broadly as "3D printing" techniques usable for producing 3D printed objects. 3D printing techniques employ one or more processes that are adapted from, and appear in some respects to be similar to, well-known processes for forming two-dimensional (2D) printed images on image receiving media substrates. Significant differences in the output structures produced by the 3D printing techniques are generally based on (1) a composition of the deposited materials that are used to form the output 3D printed objects from the 3D printer; and/or (2) a number of passes made by the "print" heads in depositing comparatively large numbers of successive (and very thin) layers of the deposition material to build up the layers to the form of the output 3D printed objects.

A number of powder-based AM techniques have been commercialized. These include Selective Laser Sintering (SLS), as well as certain adaptations of toner-based 2D printing technologies for 3D printing. Those of skill in the art recognize that, in certain of these implementations, no separate support structures are typically required to support the creation of certain complex shapes. In certain of these processes, powdered materials are selectively consolidated into 3D objects with excess powder being manually removed. In an SLS process, for example, a thin layer of powder is deposited in a workspace container and the powder is then fused together using a laser beam that traces the shape of the desired cross-section. The process is repeated by depositing layers of powder thus building the 3D object in this manner layer by layer. In a typical toner-based 3D printing process, a binder material selectively binds powder deposited in layers in a printing technology used to generally print the binder in a shape of a cross-section of the 3D object on each layer of powder.

An expanding number of AM or 3D printing processes and techniques are now available. Principal distinguishing characteristic between the multiplicities of these AM or 3D printing processes are in the manner in which the layers are deposited to create the output 3D objects, and in the materials that are used to form the output 3D objects.

Certain of the AM techniques (as this term will be used throughout the balance of this disclosure to refer to various 3D object layering and build techniques including 3D printing) melt or soften materials to produce the build layers using techniques such as, for example, selective laser melting or sintering of an input material through applied heat. Others of the AM manufacturing techniques deposit and cure liquid materials using technologies for the deposition of those liquid materials such as jetted (ink) material "printing" techniques.

Some 3D printers use a process of printing plastic in the image of the part cross section onto fibrinous sheets of a substrate web, such as carbon fiber, and then later stacking many sheets to form a stack that will become a 3D object after the stack is heated to melt or cure the plastic and the stack compressed. A next step in the process includes removing/cleaning the fibrous substrate sheet material that has not been impregnated with plastic. This is typically done with sandblasting since the substrate material is removed more easily than the substrate with the printed plastic. A concern is how to sandblast without excessively removing or damaging the 3D object.

SUMMARY

The following presents a simplified summary in order to provide a basic understanding of some aspects of one or more embodiments or examples of the present teachings. This summary is not an extensive overview, nor is it intended to identify key or critical elements of the present teachings, nor to delineate the scope of the disclosure. Rather, its primary purpose is merely to present one or more concepts in simplified form as a prelude to the detailed description presented later. Additional goals and advantages will become more evident in the description of the figures, the detailed description of the disclosure, and the claims.

The foregoing and/or other aspects and utilities embodied in the present disclosure may be achieved by providing a system and method for improving the finishing process of composite-based additive manufacturing. Pseudo images as additional printed patterns surrounding the printed part aid in the sandblasting/removal step where undesired areas of composite substrates are removed from the desired printed and fused part. Pseudo image patterns provide additional protection for delicate part features such as sharp corners. Pseudo image patterns may also provide a visual aid to an operator or automated vision system to know when the sandblasting process is nearly complete. Patterns can be optimized for sandblast angle or underlying part geometry. Benefits include improved 3D object part quality by more consistent finishing, and enabling an ability to add automated vision systems to the finishing process. The system and method may also improve part yield by reducing the number of parts damaged in finishing.

According to aspects described herein, a printing system for fabricating additive manufactured composite structures including a transfer subsystem configured to forward a substrate material through the printing system in a process direction, and an additive manufacturing device adjacent the substrate material. The additive manufacturing device is configured to deposit a polymer image in a desired pattern onto an imaging area of the substrate material resulting in the polymer image on the substrate material. The additive manufacturing device is further configured to deposit a pseudo image in a predetermined pattern onto the substrate material surrounding the polymer image, the substrate material being printed with the polymer image and the pseudo image as a slice of a 3D object, with the 3D object including a stack of a plurality of the slices absent the pseudo image.

According to aspects illustrated herein, a method for fabricating additive manufactured composite structures includes forwarding a substrate material in a process direction with a transfer subsystem of a printing system, selectively depositing a polymer image in a desired pattern onto an imaging area of the substrate material resulting in a polymer image on the substrate material with an additive manufacturing device of the printing system adjacent to the substrate material, and selectively depositing a pseudo image in a predetermined pattern onto the substrate material surrounding the polymer image with the additive manufacturing device. The substrate material is printed with the polymer image and the pseudo image as a slice of a 3D object, with the finished 3D object including a stack of a plurality of the slices absent the pseudo image.

According to aspects described herein, an additive manufacturing system for fabricating additive manufactured composite structures includes a transfer subsystem configured to forward a substrate material in a process direction, and an additive manufacturing device adjacent the substrate material. The additive manufacturing device is configured to deposit a polymer image in a desired pattern onto an imaging area of the substrate material resulting in the polymer image on the substrate material. The additive manufacturing device is further configured to deposit a pseudo image in a predetermined pattern onto the substrate material surrounding the polymer image. The additive manufacturing device includes an image forming device configured to selectively deposit an adhering agent in both the desired pattern and the predetermined pattern onto the imaging area of the substrate material, and a powder applicator configured to apply a polymer powder onto the imaging area and the adhering agent, wherein the polymer powder attaches to the substrate material via interaction with the adhering agent to form both the polymer image and the pseudo image on the substrate material. The pseudo image may have a lower polymer density than the polymer image, and may be less resistant to sand blasting than the polymer image. The predetermined pattern may be a repetitive pattern different than the desired pattern of the polymer image. Thus the substrate material may be printed with the polymer image and the pseudo image as a slice of a 3D object, the 3D object when finished including a stack of a plurality of the slices absent the pseudo image.

The additive manufacturing system and printing system may also include a 3D object finisher configured to clean the substrate material having no polymer image thereon and the pseudo images from the stack of slices, and a scanner configured to recognize the pseudo image for cleaning by the 3D object finisher.

Exemplary embodiments are described herein. It is envisioned, however, that any system that incorporates features of apparatus and systems described herein are encompassed by the scope and spirit of the exemplary embodiments.

BRIEF DESCRIPTION OF THE DRAWINGS

Various exemplary embodiments of the disclosed apparatuses, mechanisms and methods will be described, in detail, with reference to the following drawings, in which like referenced numerals designate similar or identical elements, and.

DETAILED DESCRIPTION

Illustrative examples of the devices, systems, and methods disclosed herein are provided below. An embodiment of the devices, systems, and methods may include any one or more, and any combination of, the examples described below. This invention may, however, be embodied in many different forms and should not be construed as limited to the embodiments set forth below. Rather, these exemplary embodiments are provided so that this disclosure will be thorough and complete, and will fully convey the scope of the invention to those skilled in the art. Accordingly, the exemplary embodiments are intended to cover all alternatives, modifications, and equivalents as may be included within the spirit and scope of the apparatuses, mechanisms and methods as described herein.

We initially point out that description of well-known starting materials, processing techniques, components, equipment and other well-known details may merely be summarized or are omitted so as not to unnecessarily obscure the details of the present disclosure. Thus, where details are otherwise well known, we leave it to the application of the present disclosure to suggest or dictate choices relating to those details. The drawings depict various examples related to embodiments of illustrative methods, apparatus, and systems for printing onto a substrate web and automatically stacking individual sheets of the web for AM manufacturing.

When referring to any numerical range of values herein, such ranges are understood to include each and every number and/or fraction between the stated range minimum and maximum. For example, a range of 0.5-6% would expressly include the endpoints 0.5% and 6%, plus all intermediate values of 0.6%, 0.7%, and 0.9%, all the way up to and including 5.95%, 5.97%, and 5.99%. The same applies to each other numerical property and/or elemental range set forth herein, unless the context clearly dictates otherwise.

The modifier "about" used in connection with a quantity is inclusive of the stated value and has the meaning dictated by the context (for example, it includes at least the degree of error associated with the measurement of the particular quantity). When used with a specific value, it should also be considered as disclosing that value. For example, the term "about 2" also discloses the value "2" and the range "from about 2 to about 4" also discloses the range "from 2 to 4."

The terms "media", "web", "web substrate", "print substrate" and "substrate sheet" generally refers to a usually flexible physical sheet of paper, polymer, Mylar material, plastic, or other suitable physical print media substrate, sheets, webs, etc., for images, whether precut or web fed. The listed terms "media", "print media", "print substrate" and "print sheet" may also include woven fabrics, nonwoven fabrics, metal films, carbon fiber reinforced material and foils, as readily understood by a skilled artisan.

The term "marking material" as used herein may refer to printing matter deposited by an image forming device onto a web substrate to form an image on the substrate. The listed term "marking material" may include inks, toners, metal particles, plastics, pigments, powders, molten materials, polyamide, nylon, glass filled polyamide, epoxy resins, bio-based resins, wax, graphite, graphene, carbon fiber, photopolymers, polycarbonate, polyethylene, Polylactic acid (PLA), Polyvinyl alcohol (PVA), ABS filament, high-density polyethylene (HDPE), high impact polystyrene (HIPS), Polyethylene terephthalate (PETT), ceramics, conductive filament and other inkjet materials.

The term 'image forming device", "printing device" or "printer" as used herein encompasses any apparatus that performs a print outputting function for any purpose, such as a digital copier, scanner, image printing machine, xerographic device, digital production press, document processing system, image reproduction machine, bookmaking machine, facsimile machine, multi-function machine, or the like and can include several marking engines, feed mechanism, scanning assembly as well as other print media processing units, such as paper feeders, finishers, and the like. An image forming device can handle sheets, webs, marking materials, and the like. An image forming device can place marks on any surface, and the like and is any machine that reads marks on input sheets; or any combination of such machines. A 3D printer can make a 3D object, and the like. It will be understood that the structures depicted in the figures may include additional features not depicted for simplicity, while depicted structures may be removed or modified.

The term "controller" is used herein generally to describe various apparatus relating to the operation of one or more device that directs or regulates a process or machine. A controller can be implemented in numerous ways (e.g., such as with dedicated hardware) to perform various functions discussed herein. A "processor" is one example of a controller which employs one or more microprocessors that may be programmed using software (e.g., microcode) to perform various functions discussed herein. A controller may be implemented with or without employing a processor, and also may be implemented as a combination of dedicated hardware to perform some functions and a processor (e.g., one or more programmed microprocessors and associated circuitry) to perform other functions. Examples of controller components that may be employed in various embodiments of the present disclosure include, but are not limited to, conventional microprocessors, application specific integrated circuits (ASICs), and field-programmable gate arrays (FPGAs).

The examples further include at least one machine-readable medium comprising a plurality of instructions, when executed on a computing device, to implement or perform a method as disclosed herein. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, and the like that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described therein.

As used herein, unless otherwise specified, the term "object" can also mean part, element, piece, or component. As used herein, an object refers to a 3D object to be individually built, or actually built, by a 3D printing system (printer). An object, as referred herein, is built by successively adding layers so as to form an integral piece. Some printers are capable of building, as part of the same print job, a plurality of independent pieces from a 3D model including a plurality of independent 3D objects. An object may include void spaces embedded in the object body.

Although embodiments of the invention are not limited in this regard, discussions utilizing terms such as, for example, "processing," "computing," "calculating," "determining," "using," "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

Figure 1:
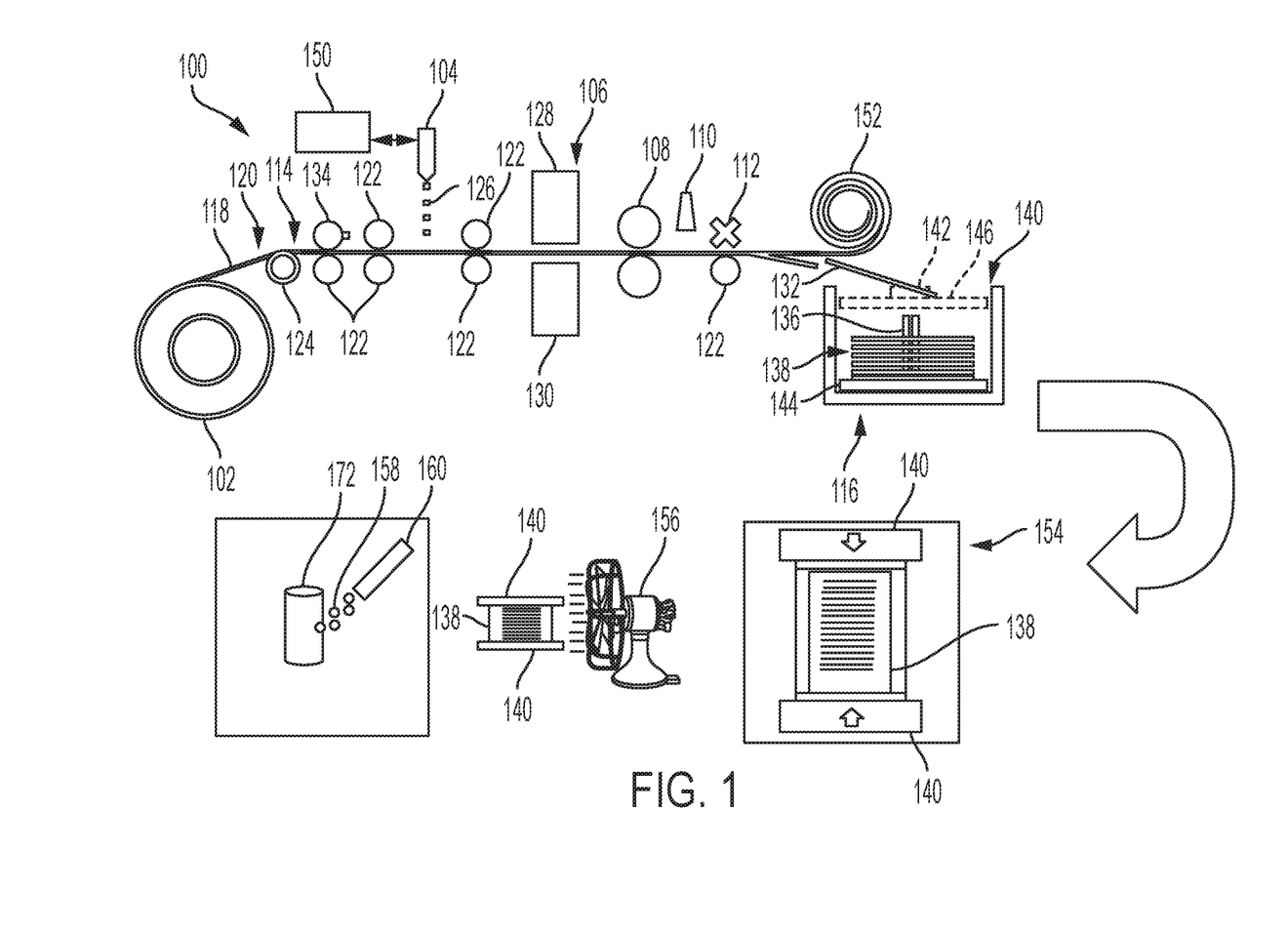
FIG. 1 is a side view of an additive manufacturing (AM) system for printing 3D objects in accordance with examples of the embodiments.

FIG. 1 is a block diagram of an exemplary AM system 100 for printing 3D objects. The AM system 100 may include components such as a material feeder 102, an image-forming device 104, a powder subsystem 106, a fuser 108, a sensor 110, a cutter 112, a transfer subsystem 114, a stacker subsystem 116, and other features that connect and control the various components. While exemplary components are shown in FIG. 1, various alternative and optional components are also suitable for use with the system 100.

In illustrative implementations, a three-dimensional (3D) object is printed in accordance with a computer 3D model of the object, created by a computer-aided design (CAD) program. For example, the CAD program may be a free-form non-uniform rational basis spline (NURBS) program, or the CAD program may be Solid Works®. In the AM system 100, marking material (e.g., powder) is selectively deposited by powder subsystem 106 in a physical pattern on a substrate material 118 (or substrate sheets thereof) that corresponds to a "positive image' of a thin slice or layer of the 3D object as defined by image forming device 104. For each slice of the 3D object, powder is attached in a pattern that correspond to positions in the slice where the 3D object exists, and powder is not attached to the substrate in positions in the slice where the 3D object does not exist. Thin slices of the 3D CAD model may be created, for example, by starting with a 3D model in STL file format and using the Slice Commander feature of Netfabb® Studio software (available from Netfabb GmbH, Parsberg, Germany) to create the thin slices. This cycle of selectively patterning substrate sheets repeated for as many additional substrate sheets as required for making the specified 3D part or object, with each sheet normally representing a layer of the 3D part or object.

The material feeder 102 holds the substrate material 118 (e.g., carbon fiber, paper) in roll or sheet form (here shown in roll form for example) and places the substrate material in proper position for transfer to the image-forming device 104. The substrate material 118 may be transferred to the image-forming device 104 via the transfer sub system 114, which may include a tensioning mechanism 120 together with feed rollers 122 used to hold and advance the web defined by the length of the substrate material fed through the AM system 100. The tensioning mechanism 120 may include one or more rollers 124 situated to keep the substrate material 118 taught as it is fed components of the AM system. The web of substrate material 118 can extend through all of the components of the AM system, including the image-forming device 104, the powder subsystem 106, the fuser 108, the sensor 110, and then be cut by the cutter 112 into single sheets prior to stacking, as discussed in greater detail below.

The image-forming device 104 may then deposit a pattern of an adhering agent (e.g., fluid 126) in image-wise fashion at precise locations onto the substrate material 118. The fluid 126 is selectively deposited on the substrate material 118 so that some parts of the material are covered with liquid as a positive image of a slice of a 3D object, and some parts of the material are not. The pattern of fluid 126 may be deposited via a variety of approaches. For example, the image-forming device 104 may include a thermal inkjet head or a piezoelectric inkjet head to dispense the fluid. In examples, the image-forming device 104 may apply air pressure to dispense the fluid 126. The image-forming device 104 may also include a solenoid valve if air pressure is used to control the release of air or dispensing of fluid.

In some cases, the fluid that is selectively deposited may be water or an aqueous solution that includes a material that slows the evaporation of water. For example, the aqueous solution may include 2-pyrrolidinone. In other cases, a different fluid, such as an alcohol may be selectively deposited. For example, if the substrate material 118 is water sensitive (e.g. polyvinyl alcohol, PVOH), then water may distort or dissolve the substrate material. In that case, an alcohol may be used as the fluid that is selectively deposited. In some cases, to prevent a liquid fluid that is selectively deposited from spreading or being excessively absorbed into the substrate, it is helpful to apply a surface energy modifier or repellent to the substrate before selectively depositing the liquid fluid.

The material feeder 102 then transfers the substrate material 118 to the powder subsystem 106, which includes a powder applicator 128 and a powder remover 130 that may be provided as separate components or integrated into a single component. In either arrangement, the powder applicator 128 is configured to deposit a 3D object powder (e.g., thermoplastic powder) onto the substrate material. The powder is configured to adhere to the areas of the substrate that have been made wet by the image-forming device 104, i.e., the layer images. In other words, the powder applicator 128 deposits powder, such as, but not limited to, thermoplastic powder, onto the surface of the substrate material 118 on which patterned layer shapes have just been printed. The powder sticks to the printed (wet) areas on the substrate material or sheet thereof, but does not adhere to portions of the substrate that are not covered with the fluid.

In typical application, the powder applicator 128 may include a trough containing the powder. The trough may have a slotted opening on its underside and is connected to an electromechanical vibrator of the powder subsystem. The vibrator, when active, causes the powder to flow downward through the slotted opening and out of the trough onto the substrate while it moves under the trough. The vibrator is actuated by a controller 150 that may include a sensor circuit that senses the presence of the patterned fluid on the substrate underneath. When the patterned fluid has completely passed, the vibrator may deactivate to cease powder flow from the trough.

The powder may be selectively deposited by other approaches. For example, the powder may be selectively deposited by flooding one side of a layer of substrate with powder, then selectively heating the opposite side of the substrate with an appropriate device such as a thermal print head. In this approach, the thermal print head includes a high-resolution array of heating elements, which may be selectively turned on or off. In the areas that are heated, the powder melts and adheres to the substrate. The excess powder that has not adhered is removed, for example by vacuuming the excess powder by the powder remover 130 or turning the substrate over with the excess powder falling off the substrate via gravity.

Alternatively, powder may be deposited using a selective deposition technique similar to that employed in xerographic printing. In this approach, an electrical charge is imparted to powder particles, which are directed toward the substrate 118 and then selectively adhere to some portions of the substrate, but not others due to electrostatic attraction or repulsion. The powder particles adhere to portions of the substrate that have an opposite electrical charge, or that are adjacent to a substrate surface that has such a charge, and are repelled from portions of the substrate that have the same electrical charge or that are adjacent to a substrate surface that has such a charge.

The powder may be alternatively deposited using a selective deposition technique similar to that employed in magnetographic printing. In this approach, powder selectively adheres to some portions of the substrate layer, but not others due to magnetostatic interactions between the powder and the substrate surface, or a substrate layer adjacent to the substrate surface. For example, the powder may be a single component magnetic toner, a colloidal suspension (e.g., a ferrofluid), or a dual component toner. A variety of magnetic pigments, such as magnetite or ferric oxide (FeO), may be used for the toner powder in this approach.

In all of the above examples, the step of selectively depositing powder may include a substep of directing solid powder toward the substrate 118 in a non-selective manner. For example, this substep may include flooding the entire surface of the substrate with powder. Or for example, in the xerographic or magnetographic examples, this substep may include sending electrically charged or magnetized powder toward the entire substrate layer.

Still referring to FIG. 1, the powder remover 130 then removes any powder that does not adhere to the substrate. The powder may be removed from the substrate, for example, by vacuuming the excess powder off as it moves adjacent the powder remover. In typical application, the powder remover 130 may include a vacuum having a vacuum motor coupled to a cyclone (to be described later). In operation, the vacuum pulls the powder that does not adhere to the substrate, while powder applied to the printed areas remain. The cyclone may recirculate the vacuumed powder back to the powder applicator 128 for reuse, as well understood by a skilled artisan. In certain circumstances the amount of powder removal from the vacuum may be insufficient since some unwanted powder may still reside on the substrate material. For this reason the powder remover 130 may include an air knife after the vacuum to remove any remaining excess powder from the substrate. The removed excess powder may also be recirculated by the cyclone back to the powder applicator for reuse.

The powder system 106 can be set to run continuously so that, once the substrate material 118 passes the image forming device 104, the substrate automatically travels through the powder system 106. Alternatively, the controller 150 in communication with the transfer subsystem 114, the image forming device and the powder system 106 can instruct the powder applicator 128 and powder remover 130 or subsystems thereof to turn on and off at the appropriate times.

After the substrate 118 has had powder applied and excess powder removed, the remaining powder may be melted onto the substrate so that the powder more permanently affixes to the printed areas of the substrate and is thus protected from displacement, disruption, or falling off during subsequent processing steps. To this end, an optional fuser 108 may be disposed after the powder system 106. The fuser 108 may be disposed above, below, or adjacent to the substrate leading out of the powder remover 130. The fuser 108 may be, for example but not limited to, radiant, IR, or other heating approach sufficient to melt and thereby fix the patterned powder to the substrate. As the substrate 118 travels out of the powder system 106, the heat from the fuser 108 melts the powder on the substrate surface causing it to fix to the substrate.

The AM system 100 may optionally have a sensor 110 (e.g., an imaging device such as a camera) to ensure that the system has not malfunctioned, that the appropriate amount of powder is deposited, that the substrate material is moving as desired, that individual substrate sheets are moving as desired, and other quality assurance aspects of the process. The sensor may operate based, for example, on input from the controller 150, or automatically upon detection of an edge of printed material or a substrate sheet.

As noted above in the exemplary AM system 100, the substrate material 118 is mounted and situated ahead of the image-forming device 104. While not being limited to a particular theory, the web of substrate material 118 can extend through all of the components of the AM system, including the image-forming device 104, the powder subsystem 106, the fuser 108, the sensor 110, and then be cut by the cutter 112 into single sheets 132 prior to stacking, with the sheets corresponding to a layer of a 3D object. This cutting separates the single sheets 132 from the web of substrate material 118, and uncut portions of the web not separated into the printed single sheets may continue and be rewound as a web of substrate material waste 152. The web of substrate material waste 152 may include the uncut portions of the web surrounding the separated sheets 132 that are stacked at the stacker subsystem 116.

In examples, the web of substrate material 118 may be cut by the cutter 112 into single sheets 132 at any prior point in the process. For example, the web may be converted to single sheets prior to advancing the resulting substrate sheets to the image-forming device 104. Likewise, single sheets may be cut from the web of substrate material 118 after the image-forming device 104 and before the powder subsystem 106, or after the powder subsystem and before the fuser 108, or after the fuser and before the sensor 110. In examples, the web may be precut into individual sheets, with the sheets arranged as a stack of sheets held by the material feeder for individual processing by the AM system. The cutter 112 may cut the sheet with a mechanical instrument (e.g., blade, punch) or other approach (e.g., laser) as well understood by a skilled artisan.

In examples, the AM system 100 may also include a punching device 134 for placing registration apertures in the substrate material 118 or substrate sheets 132 thereof at desired locations. The registration apertures are placed in precise, pre-defined positions relative to the position of the substrate sheet for precise alignment of the patterned marking material images printed onto the sheets. This can be accomplished by mounting the punching device 134 proximate to the substrate material 118 being moved by the transfer subsystem 114, for example, on the same frame that the image-forming device 104 and powder subsystem 106 are placed, or using other alignment mechanisms that are well known in the art. The punching device 134 may include a hard instrument that pokes registration apertures out of the substrate material, or a laser cutter that cuts registration apertures from the substrate material.

In order to complete the AM process of forming a 3D object, the powder printed substrate sheets 132 may be stacked by aligning the substrate sheets via their registration apertures, and fused together to attach the stacked substrate sheets into the combined object. Then the uncoated substrate material may be removed as waste from the combined object by, for example, abrasive blasting, chemical removal or dissolution. The stacker subsystem 116 is configured for stacking the cut printed substrate sheets 132 in register, based on the aforementioned registration apertures. As can be seen in FIG. 1, the stacker subsystem 116 receives the printed substrate sheets 132 with the registration apertures aligned about registration pins 136 of the stacker subassembly to form a stack 138 of the printed sheets.

After stacking the printed sheets, the patterned powder on the sheets may be combined and hardened into the 3D object. FIG. 1 shows the stacker subsystem 116 including a compressive device 140 including one or more elastic components (e.g., springs 142) to maintain pressure on the substrate sheets 132 even if they compress. After a number of substrate sheets (layers) have been placed in the stacker subsystem 116, one on top of the other on bed plate 144, the inserted substrate sheets may be compressed together with the spring 142 exerting presser on top plate 146 towards the bottom bed plate.

The compressed stack 138 may be heated, for example, in an oven 154. Heat from the oven 154 causes the thermoplastic powder to melt. The molten material coats the substrate layers. The compressive device 140, with the substrate stack 138 in it, is then removed from the oven, and the substrate layers are allowed to cool. Cooling may be expedited by convection cooling where heat is transferred from the heated stack 138 by the flow of fluid surrounding the stack. The fluid can be air via fan 156 or another suitable liquid. The molten polymer material solidifies as it cools. As it does so, it binds (fuses) the substrate sheets 132 together. Excess sheet substrate (that has not been covered by the desired solidified material) is then removed as waste as noted above by, for example, etching, abrasive blasting (e.g., sand 158 blasting from a 3D object finisher 160, bead blasting), chemical removal or dissolution to result in a cleaned 3D printed object 172.

Figure 2:
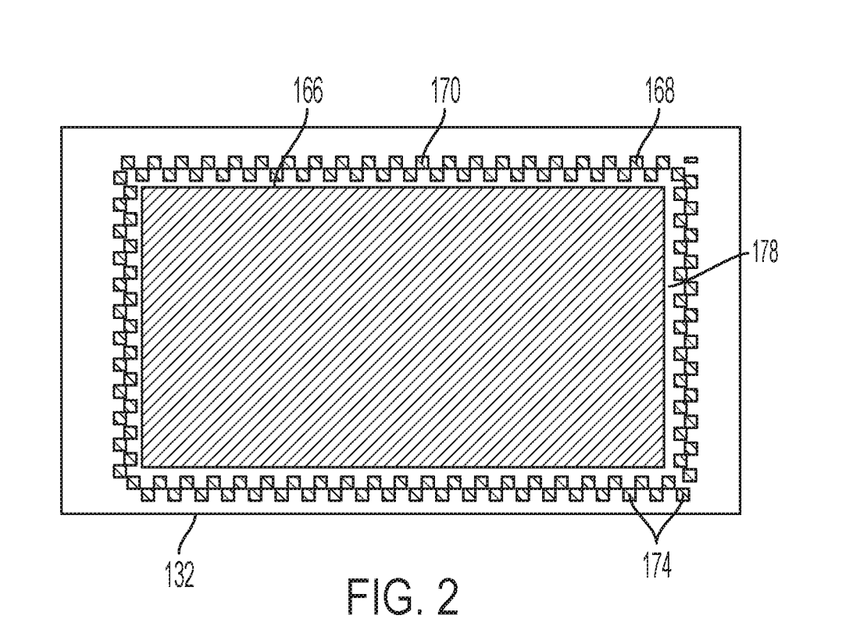
FIG. 2 illustrates an exemplary cut printed substrate sheet after a printing operation of the AM system.

The process carried out by the AM system 100 may be sequenced and monitored using one or more controllers 150. The controller 150 may read and execute build instructions generated by an outboard computer (not depicted) based on a 3D model of the object that is to be printed. For example, the material feeder 102, image-forming device 104, powder subsystem 106, fuser 108, sensor 110, cutter 112, transfer subsystem 114, punching device 134, stacker subsystem 116, compression device 140, oven 154, fan 156, and 3D object finisher 160 may operate as discussed herein based on input from the controllers. Thus while the controller 150 is shown in communication with the image-forming device 104, it is understood that the controller may be in communication with any component of the AM system 100, 200 (FIG. 2).

The examples include improvements to the AM system 100, 200 (FIG. 5) with systems and methods of improving the certainty of the excess substrate waste removal/cleaning process, which is also referred to as the etching process. While not being limited to a particular theory, the excess substrate waste removal/cleaning process discussed will focus on sandblasting as one of the exemplary useable etching processes. The approach includes printing a pseudo image as a shell layer around the desired 3D object slice with less polymer (e.g., thermoplastic) material than the 3D object solid layer slice. This slows the etching process when this pseudo image is reached.

The term "pseudo image" as used herein refers to a printed pattern different than the 3D object polymer image that forms part of the finished 3D object. The pseudo image may be printed to surround the 3D object polymer image on a printed substrate sheet 132 as a shell or border that provides notice during the excess substrate waste removal/cleaning process that the desired polymer image is nearby and extra care must be taken to avoid removal of any of the desired polymer image. In other words, the pseudo image may be removed during the waste removal/cleaning, and may not be part of the finished 3D object. The pseudo image may have a lower fill rate or polymer density than the 3D object polymer image so it can be removed during the waste removal/cleaning process efficiently. Additionally, the pseudo image may have a 3D patterned surface that can be recognized by a person doing the sandblasting or recognized automatically by an automated 3D object finisher. The 3D object finisher 160 may include a scanner 162 (e.g., camera, video recorder) configured to recognize the 3D patterned surface of the pseudo image. With detection of the pseudo image by human eye or scanner 162, the finishing process of the part can be modified to clean the 3D object with greater precision. Such modification may include slowing the finishing process (e.g., removing, cleaning, etching, sandblasting, etc) rate of material removed as needed to remove the patterned pseudo image plus any small amount of thermoplastic-free area between the pseudo image and the surface of the part without altering the 3D object shape. Another modification may include switching from automatic to manual finishing upon detection of the pseudo image. The approach creates strong fiber reinforced parts held together with a polymer (e.g., thermoplastic). The polymer may be a strong material such as Ultem or PEEK made even stronger because of the reinforcement.

As an example of an improvement, the AM system 100 includes an additive manufacturing device 164 adjacent to the substrate material 118 having the image forming device 104 and the powder subsystem 106 discussed above. The image forming device 104 may selectively depositing the adhering agent fluid 126 in a desired pattern onto portions (e.g., an imaging area) of the substrate material 118 as described above. The powder subsystem 106 includes the powder applicator 128 that applies the polymer powder onto the substrate material 118 and the adhering agent 126 desired pattern of fluid such that the polymer powder attaches to the substrate material via interaction with the adhering agent, resulting in a polymer image 166 (FIG. 2) on the substrate material. Further, as discussed above, the powder subsystem 106 also includes the powder remover 130 that removes any of the applied polymer powder that does not attach to the substrate material 118. The removal of the unattached polymer powder leaves the polymer image 166 on the substrate material, as also discussed above.

Still referring to FIG. 1, the image forming device 104 may also selectively deposit adhering agent fluid 126 in a predetermined pattern 168 (FIGS. 2-4) onto the substrate material 118 surrounding the polymer image 166. The powder subsystem 106 may then apply the polymer powder from the powder applicator 128 onto the substrate material 118 and the adhering agent 126 predetermined pattern 168 of fluid such that the polymer powder attaches to the substrate material via interaction with the adhering agent, resulting in a pseudo image 170 (FIG. 2) on the substrate material. The powder remover 130 may remove any of the applied polymer powder that does not attach to the substrate material 118, thereby leaving the pseudo image 170 surrounding the polymer image 166 on the substrate material. While the polymer image 166 becomes part of a 3D object 172, the pseudo image 170 is eventually removed by etching, sandblasting or another waste removal process by the 3D object finisher 160 to result in a cleaned 3D object absent the pseudo image.

In examples, the additive manufacturing device 164 may also include the fuser 108 downstream the powder remover 130. The fuser 108 is configured to at least partially cure the polymer image 166 and the pseudo image 170 sufficiently to stabilize the images on the substrate material so the images are not disturbed by further processing between the fuser and the waste removing/cleaning process that cleans the pseudo image off of 3D object.

FIG. 2 illustrates an exemplary cut printed substrate sheet 132 after a printing operation of the AM system 100 discussed above. The exemplary polymer image 166 is shown as a fully impregnated rectangle and the exemplary pseudo image 170 is shown partially impregnated in a predetermined pattern 168. To partially impregnate the pseudo image predetermined pattern 168, the printed regions (e.g., small squares 174) may be printed by printheads with less adhering agent liquid by printing only some of the area (e.g., half-toning, smaller adhering agent drops) so that there are limited micro spots much smaller than the printed regions for the powder to adhere. In these predetermined patterned printed regions, rather than fully filled areas of polymer powder, there may be less material per square area (e.g., fill ratio) resulting in a lower density pseudo image at the printed regions. In subsequent heating/pressing steps, for example as discussed above, these printed regions may not be fully filled or impregnated with the polymer. This makes the pseudo image 170 at the printed regions shown as small squares 174 easier to sandblast, etch or otherwise remove than fully filled regions 176 (FIG. 4) but still slower to etch than unfilled regions 178 of the printed substrate sheet 132. It is advantageous though not necessary that the pseudo image 170 as projected to the part is equally deep. In the figure above the predetermined pattern 168 is staggered so that it will take roughly an equal time to sandblast the whole pseudo image layer. A thin gap 180 may be located between the polymer image 166 and the pseudo image 170 as a small buffer to keep the images spatially separate if desired. This may help during the waste removing/cleaning process to ensure the entire pseudo image is removed while keeping the polymer image surface free of defects from attachment with any part of the pseudo image.

Figure 3:
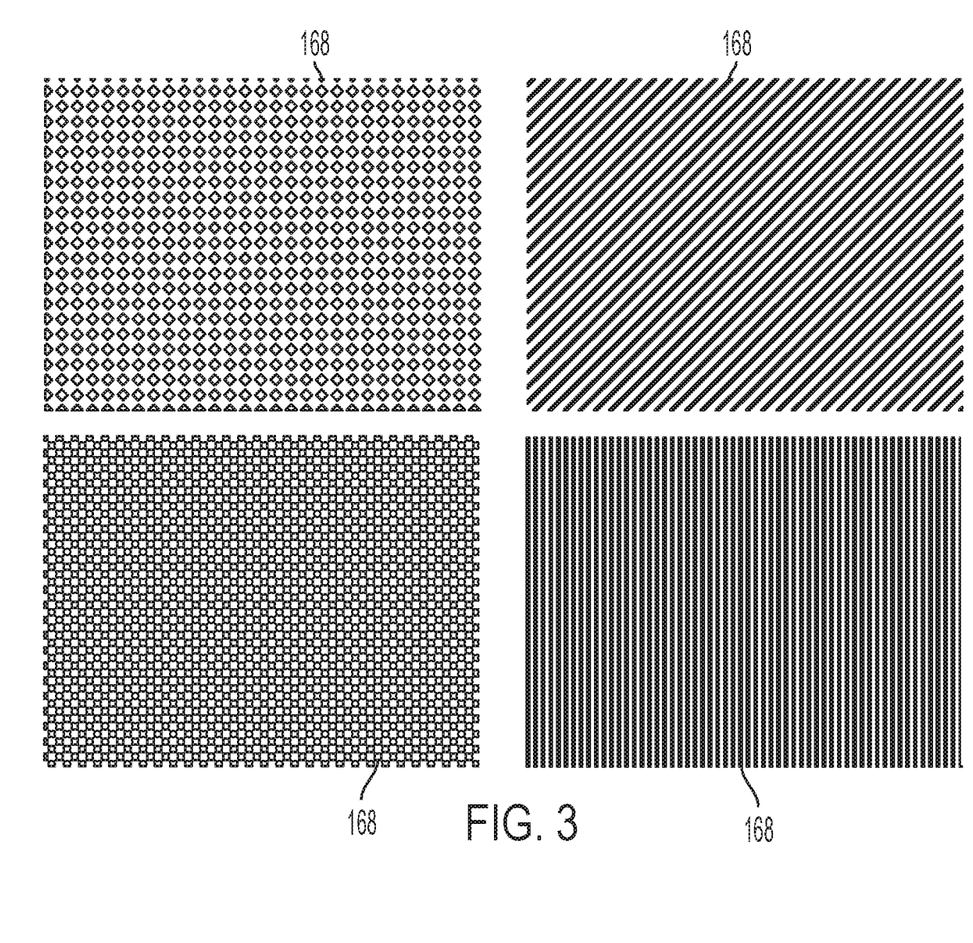
FIG. 3 illustrates exemplary predetermined pseudo image patterns after a printing operation of the AM system.

FIG. 3 illustrates exemplary predetermined pseudo image patterns 168 after a printing operation of the AM system. While not being limited to a particular theory, the imaging area of substrate material could be printed with any number of 2D predetermined patterns, including the ones shown in FIG. 3 to form a pseudo image 170. The predetermined patterns 168 may be repetitive patterns, which may be helpful since human eyes are very good at picking up such patterns. In addition a camera system (e.g., scanner 162, FIG. 1) with automated processing can also be programmed or in communication with the controller 150 to pick up a specific pattern with greater sensitivity than a stochastic layout. For example, the controller 150 include or communicate with a pattern detection system that can be automated by real time video detection with analysis that detects the emergence and disappearance of the patterns during waste removal/cleaning, such as sandblasting or other etching to provide guidance for etching time limits and settings to ensure optimal material removal. The predetermined pattern 168 may be a combination of different patterns, which may be helpful to distinguish different regions of the 3D part.

The predetermined patterns 168 may be large enough for easy viewing by a user or scanner 162, for example, with at least 1 mm repeats. The patterns may also be large enough so that they are larger than an inherent flow of printed polymer material during heating and/or pressing stages of the AM process, as this may avoid significant pattern blurring. Exemplary patterns are not limited to the patterns shown in FIG. 3, and predetermined patterns 168 may have more rounded that may be less apt to be blurred by polymer material flow.

As noted above, the printed regions of the predetermined patterns 168 may be printed with less adhering agent liquid by printing only some of the area (e.g., halftoning or the like) so that there are limited micro spots much smaller than the printed regions for the powder to adhere. While not being limited to a particular theory, the limited inking needed to partially fill regions of the predetermined patters 168 with powder may include printing drops in patterns analogous to halftoning. The drops may be grouped as they are in a dot growth halftone or distributed as drops as in a stochastic halftone pattern. A combination of adhering agent drops in regions like a dot growth halftone may be preferable to a stochastic combination, as the adhering agent liquid may be drawn into the fiber substrate material 118. Thus groupings of many drops in the predetermined pattern printed regions, like with halftone-like dot patterns of at least 200 dots per inch (DPI), or at least 300 DPI, or at least between 300-600 DPI, may be usable so that the polymer material can adhere to the liquid dots evenly and with a lower density than the polymer image 166. It is understood that a stochastic combination or halftone may not have a consistent DPI, but may average at least 200 DPI over the area of the predetermined pattern 168. Accordingly, the overall polymer density of the pseudo image 170 may be lower than the polymer image 166 by the predetermined pattern 168 and/or the fill ratio of the printed regions of the predetermined patterns.

The term "halftones" as used herein is not limited to a technique that simulates continuous-tone imagery through the use of dots, varying either in size or in spacing. Halftones as use herein may also refer to patterns analogous to halftones. An analogous technique to halftones include the option that the AM system and method may not fill all available pixel locations as may be recognized to halftone mapping of input levels for pixel locations. Examples may use an ordered or semi-ordered pattern that may not otherwise be considered as part of a recognized halftone. There may be an ordering of dots that is preferred and it may depend on the local arrangement of drops and the overall coverage of those drops. Optimization for aspects of structure over visible ranges is not critical possibly other than how unintended structures from the printing might affect development and etching.

Figure 4:
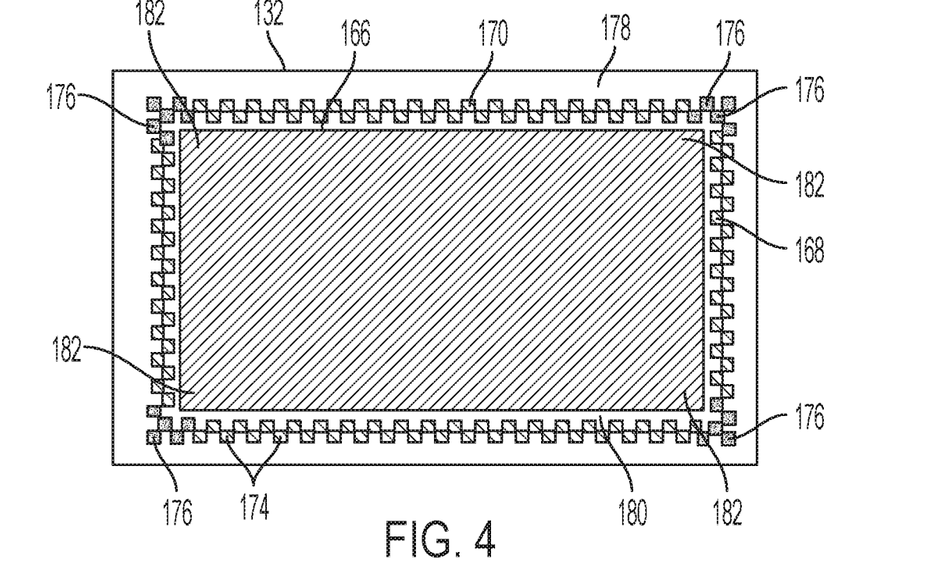
FIG. 4 illustrates another exemplary cut printed substrate sheet after a printing operation of the AM system.

FIG. 4 illustrates another exemplary cut printed substrate sheet 132 after a printing operation of the AM system. The pseudo image 170 may include small squares 174 or other small printing regions having a density lower that the print density of the polymer image 166. Some of the printing regions may be more fully filled printed regions 176, having a print density greater than the lower print density of the small squares shown in FIG. 2, and the higher more fully filled print density of the polymer image 166. Placement of the more fully filled printed regions 176, for example, around corners or other sharp features of the polymer image 166 may provide greater protection of the sharp features. By placing a sandblasting stop around the sharp features (e.g., corners 182) of the polymer image 166 and possibly increasing the coverage of polymer about such regions, sharp features can be protected during normal sandblasting and only exposed by extra exposure at the very end of the cleaning process. This could help mitigate the possibility of extra exposure of sharp features from, for example, sandblasting from more than one direction.

While not being limited to a particular theory, corners 182 of the object slice polymer image 166 are surrounded by harder to sandblast printed regions 176 (that are still easier to etch than the polymer image) to protect the corners from uneven sandblasting. Other options for protecting the corners 182 from uneven sandblasting, which may occur when etching or sandblasting from different angular directions, include making the more fully filled printed regions 176 thicker to increase etching time. It is understood that patterns and the level of polymer fill at the printed regions 176 may be modified for various aspect of the waste removal/cleaning process. For example, patterns/fill ratio may be modified to account for different angles of sandblasting based on the part (e.g., polymer image shape) itself as might be limited by other portions of a part, such as a more interior region that can only be reached from one direction. As another example, patterns/fill ratio may be modified to account for regions around an interior that might need more protection while the interior is sandblasted.

Figure 5:
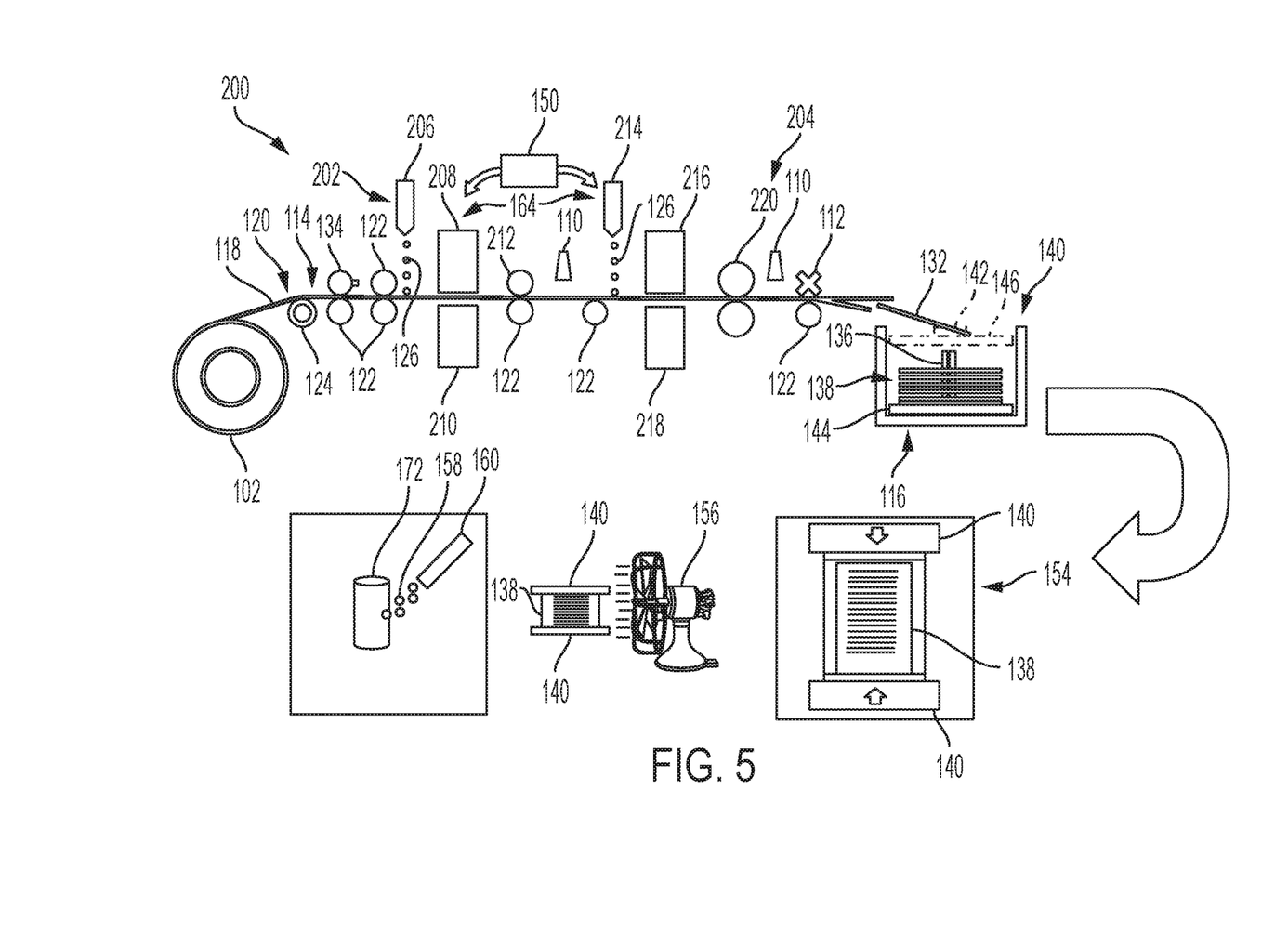
FIG. 5 is a side view of another AM system for printing 3D objects in accordance with examples of the embodiments.

As discussed with reference to FIG. 1, the additive manufacturing device 164 includes the image forming device 104 and the powder subsystem 106, with the powder subsystem 106 including the powder applicator 128 and the powder remover 130. Further, the additive manufacturing device 164 may include the fuser 108 downstream the powder remover 130. While each of the additive manufacturing device 164 elements may be discussed as singular units, the elements are not so limited and may include more than one of the respective units. As an example, FIG. 5 depicts the AM system 200, which is like the AM system 100 with components of the additive manufacturing device 164 having a plurality of units.

In particular, the additive manufacturing device 164 may include a first AM device section 202 and a second AM device section 204 downstream the first AM device section in the process direction. While not being limited to a particular theory, the process direction may be a construction process direction of the substrate material 118 from the material feeder 102 to the stacker subsystem 116. The process direction may also include further construction processing steps to the stack 138 of printed sheets, including heating, pressing, cooling, and removing/cleaning generally as discussed herein by example. This construction process direction may differ from process directions of components within the AM system 100, 200, such as a direction of movement of heads shuttling back and forth in a process or cross-process direction.

The first AM device section 202 may include a first image forming device unit 206, a first powder applicator unit 208 and a first powder remover unit 210. The first image forming device unit 206 is a part of the image forming device 104 and configured to selectively deposit a first adhering agent in the desired pattern onto the imaging area of the substrate material 118. The first powder applicator unit 208 is a part of the powder applicator 128 and configured to apply a polymer powder onto the imaging area and the first adhering agent. The polymer powder may attach to the substrate material 118 via interaction with the first adhering agent to form the polymer image 166 in the imaging area. The first powder remover unit 210 is a part of the powder remover 130 and configured to remove any of the applied polymer powder that does not attach to the substrate material 118, resulting in the polymer image 166 on the substrate material. The first AM device section 202 may also include a first fuser unit 212 that is part of the fuser 108. The first fuser unit 212 is configured to at least partially cure the polymer image 166 sufficiently to stabilize the image on the substrate material so the image is not disturbed by further processing between the fuser unit and the waste removing/cleaning process that cleans the pseudo image off of 3D object.

The second AM device section 204 may include a second image forming device unit 214, a second powder applicator unit 216 and a second powder remover unit 218. The second image forming device unit 214 is another part of the image forming device 104 and configured to selectively deposit a second adhering agent in a predetermined pattern 168 onto the imaging area of the substrate material 118 surrounding the polymer image 166. The second powder applicator unit 216 is another part of the powder applicator 128 and configured to apply a second powder onto the predetermined pattern 168 surrounding the polymer image 166 to form the pseudo image 170 on the substrate material 118. The second powder remover unit 218 is another part of the powder remover 130 and configured to remove any of the applied second powder that does not attach to the substrate material 118, resulting in the pseudo image 170 surrounding the polymer image on the substrate material. The second AM device section 204 may also include a second fuser unit 220 that is part of the fuser 108. The second fuser unit 220 is configured to at least partially cure the polymer image 166 and the pseudo image 170 sufficiently to stabilize the images on the substrate material so the images are not disturbed by further processing between the fuser unit and the waste removing/cleaning process that cleans the pseudo image off of 3D object.

The second adhering agent or the second powder may be different than the first adhering agent or the first powder, respectively, to produce a pseudo image 170 different than the polymer image in some manner. For example, the second adhering agent and/or the second powder may have properties such that a combination of the liquid and powder result in the pseudo image 170 being a different color than the polymer image. The second powder may be a different color, such as a bright or fluorescent color (e.g., yellow, orange, green, red, pink). This may be beneficial to a user or scanner 162 recognizing the pseudo image 170 for optimal waste removal of the pseudo image and substrate material having no polymer image thereon, while avoiding unwanted removal of any of the polymer image. For an AM system 200 that has color capability for the printed polymer inks, contrast for the pattern can be enhanced with color by creating additional contrast for outer and inner printed regions (e.g., squares) of the pseudo image 170.

Figure 6:
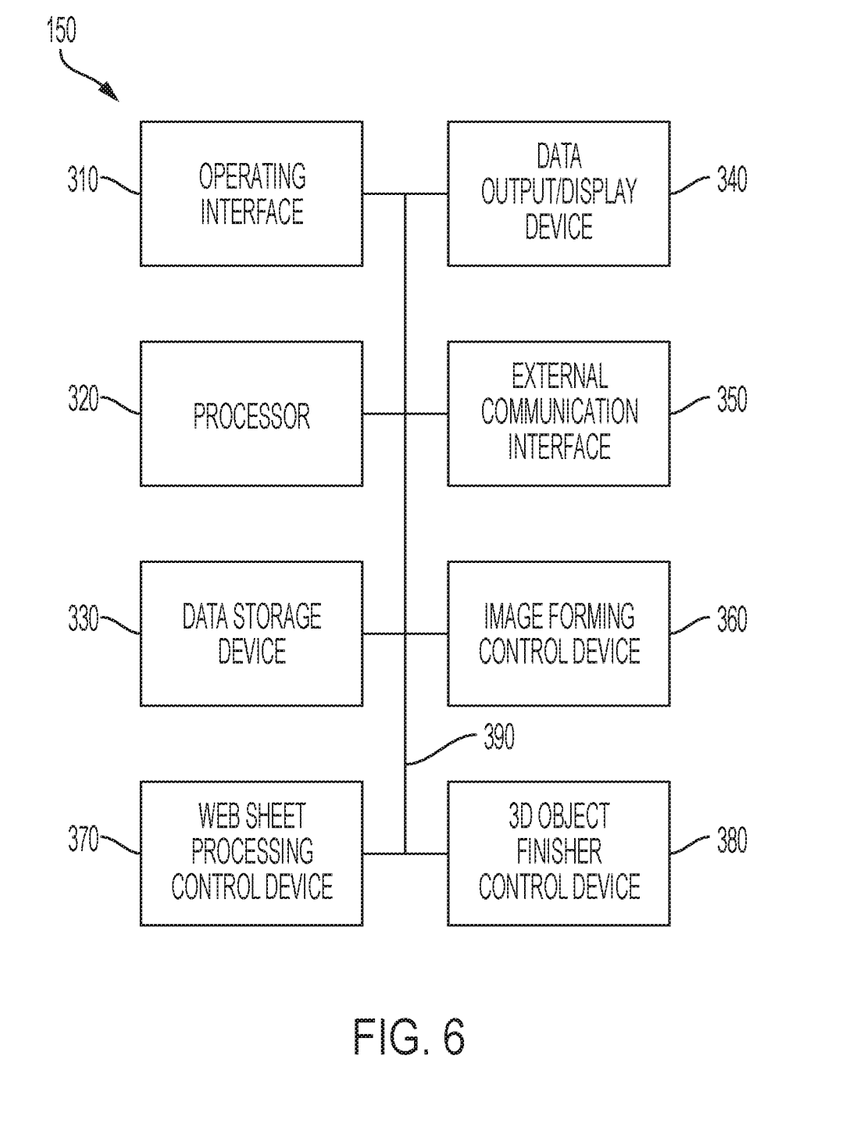
FIG. 6 illustrates a block diagram of an exemplary control system for implementing a composite based additive manufacturing sewing scheme.

FIG. 6 illustrates a block diagram of the controller 150 for executing instructions to automatically control exemplary devices in the AM systems 100 and 200. The exemplary controller 150 may provide input, to or be a component of a controller for executing the AM 3D object forming process in a system such as that depicted in FIGS. 1 and 5 and described in greater detail below in FIG. 7.

The exemplary control system 150 may include an operating interface 310 by which a user may communicate with the exemplary control system 150. The operating interface 310 may be a locally-accessible user interface associated with the AM 3D object forming system 100, 200. The operating interface 310 may be configured as one or more conventional mechanism common to control devices and/or computing devices that may permit a user to input information to the exemplary control system 150. The operating interface 310 may include, for example, a conventional keyboard, a touchscreen with "soft" buttons or with various components for use with a compatible stylus, a microphone by which a user may provide oral commands to the exemplary control system 150 to be "translated" by a voice recognition program, or other like device by which a user may communicate specific operating instructions to the exemplary control system 150. The operating interface 310 may be a part or a function of a graphical user interface (GUI) mounted on, integral to, or associated with, the AM system 100, 200 with which the exemplary control system 150 is associated.

The exemplary control system 150 may include one or more local processors 320 for individually operating the exemplary control system 150 and for carrying into effect control and operating functions for AM 3D object forming, including implementing composite-based layer forming schemes, and waste removal/cleaning schemes with the AM system 100, 200 with which the exemplary control system 150 may be associated. Processor(s) 320 may include at least one conventional processor or microprocessor that interpret and execute instructions to direct specific functioning of the exemplary control system 150, and control of the AM 3D object forming process and/or waste removal/cleaning with the exemplary control system 150.

The exemplary control system 150 may include one or more data storage devices 330. Such data storage device(s) 330 may be used to store data or operating programs to be used by the exemplary control system 150, and specifically the processor(s) 320. Data storage device(s) 330 may be used to store information regarding, for example, one or more 3D object models for producing 3D objects in an AM system with which the exemplary control system 150 is associated. Stored 3D object model information may be devolved into data for the printing of a series of layers of 2D slices and web sheet processing for forming the 3D object in the manner generally described by example herein.

The data storage device(s) 330 may include a random access memory (RAM) or another type of dynamic storage device that is capable of storing updatable database information, and for separately storing instructions for execution of AM system operations by, for example, processor(s) 320. Data storage device(s) 330 may also include a read-only memory (ROM), which may include a conventional ROM device or another type of static storage device that stores static information and instructions for processor(s) 320. Further, the data storage device(s) 330 may be integral to the exemplary control system 150, or may be provided external to, and in wired or wireless communication with, the exemplary control system 150, including as cloud-based data storage components.

The exemplary control system 150 may include at least one data output/display device 340, which may be configured as one or more conventional mechanism that output information to a user, including, but not limited to, a display screen on a GUI of the AM system 100, 200 with which the exemplary control system 150 may be associated. The data output/display device 340 may be used to indicate to a user a status of a 3D object forming operation effected by the AM system with which the exemplary control system 150 may be associated including an operation of one or more individually controlled components at one or more of a plurality of separate processing stations or subsystems in the systems. For example, predetermined patterns 168 with smaller repeats, including repeats less than 10 mm, less than 5 mm, or even less than 1 mm may still be detected by the scanner 162 and visually enhanced via the control system 150 to display the pattern with greater clarity on a display device 340 for use by an operator to finish the 3D object 172.

The exemplary control system 150 may include one or more separate external communication interfaces 350 by which the exemplary control system 150 may communicate with components that may be external to the exemplary control system such as the 3D object finisher 160. At least one of the external communication interfaces 350 may be configured as an input port to support connecting an external CAD/CAM device storing modeling information for execution of the control functions in the 3D object forming operations. Any suitable data connection to provide wired or wireless communication between the exemplary control system 150 and external and/or associated components is contemplated to be encompassed by the depicted external communication interface 350.

The exemplary control system 150 may include an image forming control device 360 that may be used to control the image forming process on the substrate material 118 (e.g., image forming device 104, powder subsystem 106, fuser 108, additive manufacturing device 164, first AM device section 202, second AM device section 204) which produces the series of 2D slices (e.g., printed substrate sheets 132 having the polymer image 166 and pseudo image 170 thereon) for the in-process 3D object according to devolved 3D object modeling information. The substrate material 118 may be fed through the additive manufacturing device 164 and/or the image forming device 104, powder subsystem 106 and fuser 108 to have marking material images formed thereon under the control of the image forming control device 360. The substrate material may exit the powder subsystem 106 or the additive manufacturing devices 164 as a printed substrate web and be cut and automatically stacked in order to constitute a stack 138 of the printed sheets. The image forming control device 360 may operate as a part or a function of the processor 320 coupled to one or more of the data storage devices 330, or may operate as a separate stand-alone component module or circuit in the exemplary control system 150. Either of the processor 320 or the image forming control device 360 may parse the input 3D object model information to determine and execute a layer-by-layer 2D slice material layer printing scheme including a pseudo image printing scheme on the substrate material 118 in the AM system 100, 200.

The exemplary control system 150 may include a web sheet processing control device 370 coupled to one or more of the data storage devices 330, or as a separate stand-alone component module or station in the exemplary control system 150. In instances in which the printed substrate material web is to be used for web sheet cutting, delivery and stacking, the same exemplary control system 150, through the cutter 112 and stacker subsystem 116, may be usable to control the web sheet cutting and stacking process. In such instances, the cutter 112 may be usable with the transfer subsystem 114 to separate printed substrate sheet 132 from the substrate web as it is fed past the cutter, to deliver (e.g., move, forward) the printed layer sheets over the stacker subsystem 116, and to stack the printed layer sheets in precise alignment as the stack 138 for later use. The web sheet processing control device 370 may control a rate at which the substrate web is fed to the cutter 112 for severing printed substrate sheets 132 therefrom. Heating, pressing and further processing of the stack 138 may be provided subsequently off line as needed to not slow down the image forming process and web sheet processing.

The exemplary control system 150 may include a 3D object finisher control device 380 for executing a final 3D object shaping scheme on a processed stack of cut printed sheet slices in a subtractive machining process that may remove the layered support component structure—including the pseudo image 170 and material substrate having no polymer image thereon—and surface finish the 3D object. As with the above-enumerated other separate control devices, the 3D object finisher control device 380 may operate as a part or a function of the processor 320 coupled to one or more data storage devices 330 for executing finishing device operations, or may operate as a separate stand-alone component module or circuit in the exemplary control system 150.

All of the various components of the exemplary control system 150, as depicted in FIG. 6, may be connected internally, and to one or more AM object forming devices and/or components thereof, by one or more data/control busses 390. These data/control busses 390 may provide wired or wireless communication between the various components of the exemplary control system 150, whether all of those components are housed integrally in, or are otherwise external and connected to an AM system 100, 200 with which the exemplary control system 150 may be associated.

It should be appreciated that, although depicted in FIG. 6 as an integral unit, the various disclosed elements of the exemplary control system 150 may be arranged in any combination of sub-systems as individual components or combinations of components, integral to a single unit, or external to, and in wired or wireless communication with the single unit of the exemplary control system. In other words, no specific configuration as an integral unit or as a support unit is to be implied by the depiction in FIG. 6. Further, although depicted as individual units for ease of understanding of the details provided in this disclosure regarding the exemplary control system 150, it should be understood that the described functions of any of the individually-depicted components, and particularly each of the depicted control devices, may be undertaken, for example, by one or more processors 320 connected to, and in communication with, one or more data storage device(s) 330.

Figure 7:
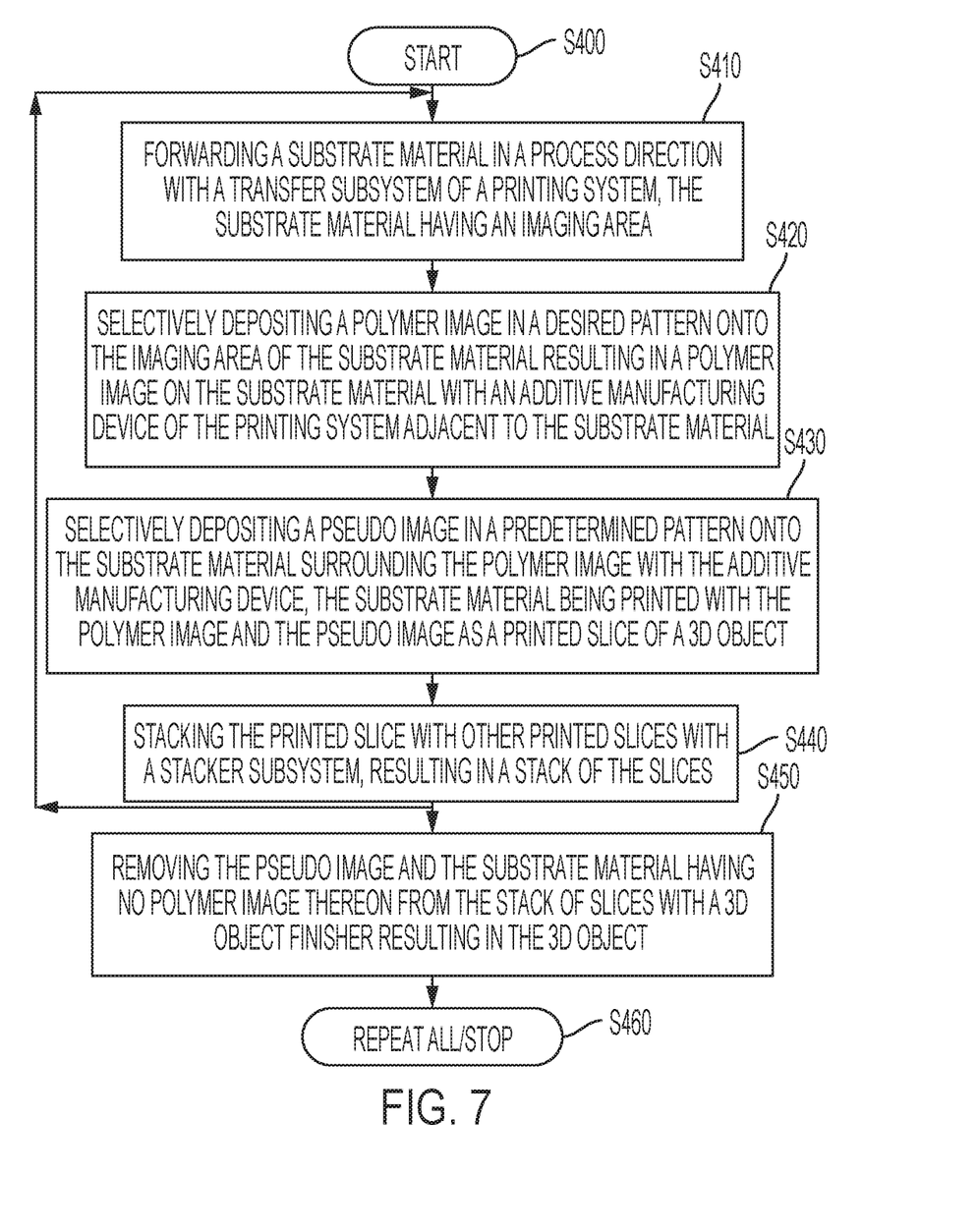
FIG. 7 is a flowchart depicting the operation of an exemplary method for sewing printed sheets to bond a stack of the printed sheets.

The disclosed embodiments may include an exemplary method for fabricating additive manufactured composite structures with an AM system 100, 200. FIG. 8 illustrates a flowchart of such an exemplary AM processing method during composite based additive manufacturing, which commences at Step S400 and proceeds to Step S410.

At Step S410, the transfer subsystem 114 forwards a substrate material having an imaging area in a process direction from a material feeder 102 through an additive manufacturing system 100, 200. Operation of the method proceeds to Step S420, where an additive manufacturing device of the AM system adjacent to the substrate material selectively deposits a polymer image in a desired pattern onto the imaging area of the substrate material resulting in a polymer image on the substrate material. Step S420 may include selectively depositing an adhering agent in the desired pattern onto the imaging area of the substrate material with an image forming device, and applying a polymer powder onto the imaging area via a powder applicator to attach the polymer powder to the substrate material via interaction with the adhering agent. Operation of the method proceeds to Step S430.

At Step S430, the additive manufacturing device selectively deposits a pseudo image in a predetermined pattern onto the substrate material surrounding the polymer image. The substrate material is printed with the polymer image and the pseudo image as a printed slice of a 3D object. Step S430 may include selectively depositing the adhering agent in the predetermined pattern onto the substrate material with the image forming device, and applying the polymer powder onto the predetermined pattern via the powder applicator to attach the polymer powder to the substrate via interaction with the adhering agent. It is understood that deposition of the polymer image in Step S420 and the deposition of the pseudo image in Step S430 may occur simultaneously, nearly simultaneously or in any order of processing in the same printing operation or in different printing operations.

Operation of the method shown in FIG. 7 proceeds to Step S440, where a stacker subsystem stacks the printed slice with other printed slices to form a stack of the slices. Operation may repeat back to Step S410 to increment the stack with additional printed layer slices until the stack is completed. Then the stack is ready for subsequent processing, such as heating, compressing and cleaning. For the cleaning, operation of the method proceeds to Step S450, where a 3D object finisher removes the pseudo image and the substrate material having no polymer image thereon from the stack of slices, resulting in the 3D object. The 3D object after Step S450 is a cleaned 3D object including the stack of the slices absent the pseudo image.

The exemplary depicted sequence of executable method steps represents one example of a corresponding sequence of acts for implementing the functions described in the steps. The exemplary depicted steps may be executed in any reasonable order to carry into effect the objectives of the disclosed embodiments. No particular order to the disclosed steps of the method is necessarily implied by the depiction in FIG. 7, and the accompanying description, except where any particular method step is reasonably considered to be a necessary precondition to execution of any other method step. Individual method steps may be carried out in sequence or in parallel in simultaneous or near simultaneous timing. Additionally, not all of the depicted and described method steps need to be included in any particular scheme according to disclosure.

Those skilled in the art will appreciate that other embodiments of the disclosed subject matter may be practiced with many types of image forming elements common to 3D inking system in many different configurations. For example, although single-pass marking material deposition is shown in the discussed embodiments, the examples may apply to multi-pass systems and methods, including 3D object forming systems and methods. Also, while single-side printing is shown in the discussed embodiments, the examples may apply to multi-sided printing. It should be understood that these are non-limiting examples of the variations that may be undertaken according to the disclosed schemes. In other words, no particular limiting configuration is to be implied from the above description and the accompanying drawings.

It will be appreciated that various of the above-disclosed and other features and functions, or alternatives thereof, may be desirably combined into many other different systems or applications. Also, various presently unforeseen or unanticipated alternatives, modifications, variations or improvements therein may be subsequently made by those skilled in the art.

What is claimed is:

1. A printing system for fabricating additive manufactured composite structures, comprising:
   a slice of a 3D object, the slice including a substrate material having a polymer image and a pseudo image surrounding the polymer image and spatially separated from the polymer image by a non-printed gap;
   a transfer subsystem configured to forward the substrate material through the printing system in a process direction;
   an additive manufacturing device adjacent to the substrate material, and
   a controller in communication with the additive manufacturing device, the controller configured to control the additive manufacturing device to deposit the polymer image in a desired pattern onto an imaging area of the substrate material resulting in the polymer image on the substrate material, the controller further configured to control the additive manufacturing device to deposit the pseudo image in a predetermined pattern onto the substrate material surrounding the polymer image and spatially separate from the polymer image with the non-printed gap of the substrate material between the polymer image and the pseudo image, the substrate material being printed with the polymer image and the pseudo image as the slice of the 3D object, the 3D object including a stack of a plurality of the slices absent the pseudo image,
   wherein the polymer image includes an exterior corner portion and exterior non-sharp regions adjacent the exterior corner portion, and the pseudo image includes a corner border portion proximate and outside the exterior corner portion and non-corner border portions proximate and outside the exterior non-sharp regions, the corner border portion having a higher polymer density than the non-corner border portions of the pseudo image.

2. The printing system of claim 1, the additive manufacturing device including:
  image forming device configured to selectively deposit an adhering agent in both the desired pattern and the predetermined pattern onto the imaging area of the substrate material, and
  a powder applicator configured to apply a polymer powder onto the imaging area and the adhering agent, wherein the polymer powder attaches to the substrate material via interaction with the adhering agent to form both the polymer image and the pseudo image on the substrate material.

3. The printing system of claim 1, the additive manufacturing device including a first additive manufacturing device section and a second additive manufacturing device section downstream the first additive manufacturing device section in the process direction,
  the first additive manufacturing device section including a first image forming device configured to selectively deposit a first adhering agent in the desired pattern onto the imaging area of the substrate material, a first powder applicator configured to apply a polymer powder onto the imaging area and the first adhering agent, wherein the polymer powder attaches to the substrate material via interaction with the first adhering agent to form the polymer image in the imaging area, and a first powder remover configured to remove any of the applied polymer powder that does not attach to the substrate material, resulting in the polymer image on the substrate material,
  the second additive manufacturing device section including a second image forming device for selectively depositing a second adhering agent in the predetermined pattern onto the imaging area of the substrate material surrounding the polymer image, a second powder applicator configured to apply a second powder onto the predetermined pattern surrounding the polymer image to form the pseudo image on the substrate material, and a second powder remover configured to remove any of the applied second powder that does not attach to the substrate material, resulting in the pseudo image surrounding the polymer image on the substrate material.

4. The printing system of claim 1, wherein the pseudo image is less resistant to sand blasting than the polymer image.

5. The printing system of claim 1, wherein the pseudo image is a different color than the polymer image.

6. The printing system of claim 1, wherein the predetermined pattern includes a repetitive pattern different than the desired pattern of the polymer image.

7. The printing system of claim 1, wherein the pseudo image has a lower polymer density than the polymer image.

8. The printing system of claim 7, wherein the predetermined pattern includes a halftone pattern.

9. The printing system of claim 1, further comprising a 3D object finisher configured to clean the substrate material having no polymer image thereon and the pseudo images from the stack of slices, and a sensor configured to recognize the pseudo image for cleaning by the 3D object finisher.

10. The printing system of claim 1, the controller further configured to control the additive manufacturing device in depositing the corner border portion proximate the corner exterior portion extending radially outwards from the corner exterior portion and in depositing the non-corner border portions of the pseudo image proximate and outside the exterior non-sharp regions to correspond to the corner border portion in distance from the polymer image.

11. A method for fabricating additive manufactured composite structures using the printing system of claim 1, comprising:
  a) forwarding the substrate material in a process direction with the transfer subsystem of a printing system, the substrate material having an imaging area;
  b) selectively depositing the polymer image in the desired pattern onto the imaging area of the substrate material resulting in the polymer image on the substrate material with the additive manufacturing device of the printing system adjacent to the substrate material; and
  c) selectively depositing the pseudo image in the predetermined pattern onto the substrate material surrounding and spatially separate from the polymer image with the additive manufacturing device via control by the controller, the selectively depositing the pseudo image leaving the non-printed gap of the substrate material between the polymer image and the pseudo image,
  the substrate material being printed with the polymer image and the pseudo image as the slice of a 3D object, the 3D object including the stack of the plurality of the slices absent the pseudo image, wherein the polymer image includes an exterior corner portion and exterior non-sharp regions adjacent the exterior corner portion, and the pseudo image includes a corner border portion proximate and outside the exterior corner portion and non-corner border portions proximate and outside the exterior non-sharp regions, the corner border portion having a higher polymer density than the non-corner border portions of the pseudo image.

12. The method of claim 11, the step b) further including selectively depositing an adhering agent in the desired pattern onto the imaging area of the substrate material with an image forming device, and applying a polymer powder onto the imaging area via a powder applicator to attach the polymer powder to the substrate material via interaction with the adhering agent, the additive manufacturing device including the image forming device and the powder applicator, the step c) further including selectively depositing the adhering agent in the predetermined pattern onto the substrate material with the image forming device, and applying the polymer powder onto the predetermined pattern via the powder applicator to attach the polymer powder to the substrate via interaction with the adhering agent, and further comprising removing any of the applied polymer powder that does not attach to the substrate material with a powder remover, resulting in the polymer image and the pseudo image on the substrate material.

13. The method of claim 11, further comprising removing the pseudo image and the substrate material having no polymer image thereon from the stack of the slices with a 3D object finisher resulting in the 3D object.

14. The method of claim 13, further comprising automatically detecting the pseudo image surrounding the polymer image with a scanner.

15. The method of claim 13, further comprising detecting the pseudo image surrounding the polymer image and modifying the removing step upon detection of the pseudo image, the modifying including slowing a speed of the removing of the pseudo image and the substrate material having no polymer image thereon adjacent the polymer image.

16. An additive manufacturing system for fabricating additive manufactured composite structures, comprising:
  a slice of a 3D object, the slice including a substrate material having a polymer image and a pseudo image surrounding the polymer image and spatially separated from the polymer image by a non-printed gap;

a transfer subsystem configured to forward the substrate material in a process direction;

an additive manufacturing device adjacent to the substrate material;

a controller in communication with the additive manufacturing device, the controller configured to control the additive manufacturing device to deposit the polymer image in a desired pattern onto an imaging area of the substrate material resulting in the polymer image on the substrate material, the controller further configured to control the additive manufacturing device to deposit the pseudo image in a predetermined pattern onto the substrate material surrounding the polymer image and spatially separate from the polymer image with the non-printed gap of the substrate material between the polymer image and the pseudo image, the additive manufacturing device including an image forming device configured to selectively deposit an adhering agent in both the desired pattern and the predetermined pattern onto the imaging area of the substrate material, and a powder applicator configured to apply a polymer powder onto the imaging area and the adhering agent, wherein the polymer powder attaches to the substrate material via interaction with the adhering agent to form both the polymer image and the pseudo image on the substrate material, resulting in the slice of the 3D object;

wherein the pseudo image has a lower polymer density than the polymer image, the pseudo image is less resistant to sand blasting than the polymer image, the predetermined pattern is a repetitive pattern different than the desired pattern of the polymer image, the polymer image includes an exterior corner portion and exterior non-sharp regions adjacent the exterior corner portion, and the pseudo image includes a corner border portion proximate and outside the exterior corner portion and non-corner border portions proximate and outside the exterior non-sharp regions, the corner border portion having a higher polymer density than the non-corner border portions of the pseudo image; and a 3D object finisher configured to clean the substrate material having no polymer image thereon and the pseudo images from the stack of slices, and a sensor configured to recognize the pseudo image for cleaning by the 3D object finisher, the 3D object including a stack of a plurality of the slices absent the pseudo image.

17. The printing system of claim 16, the controller further configured to control the additive manufacturing device in depositing the corner border portion proximate the corner exterior portion extending radially outwards from the corner exterior portion and in depositing the non-corner border portions of the pseudo image proximate and outside the exterior non-sharp regions to correspond to the corner border portion in distance from the polymer image.

* * * * *